3,346,394
CONTINUOUS MANUFACTURE OF COMMINUTED MEAT PRODUCTS

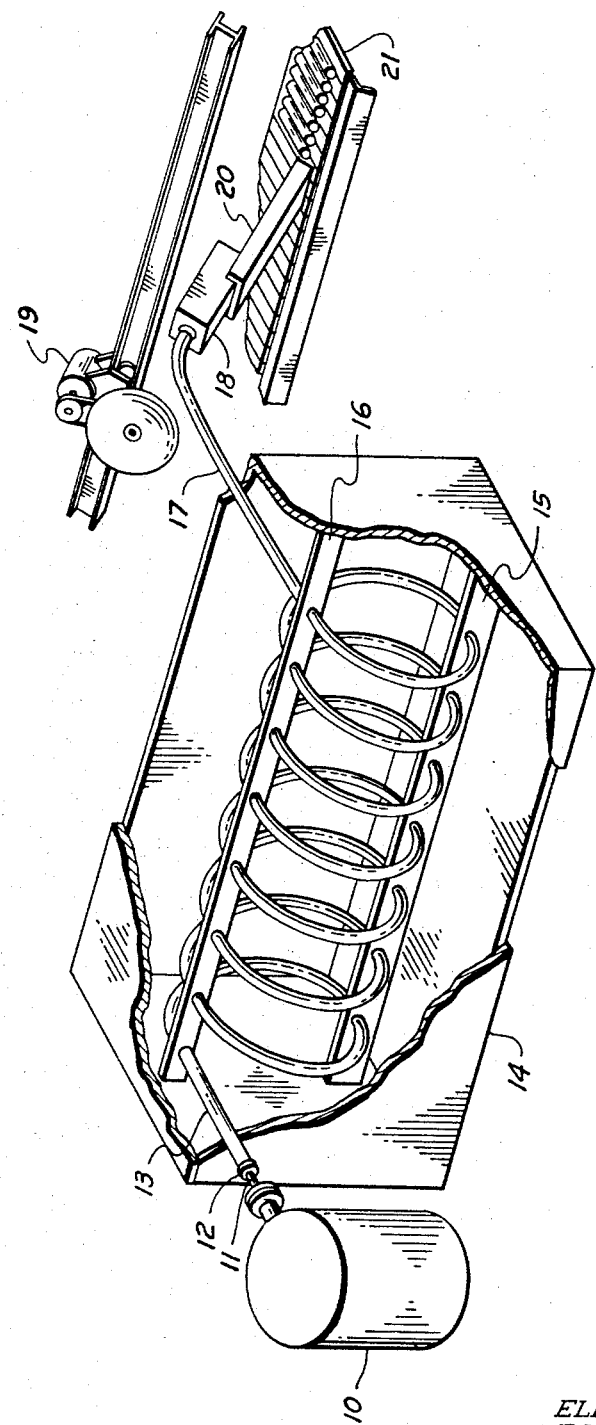

Elbert H. Rongey, Park Forest, Ill., and Robert J. Hlavacek, Buena Park, Calif., assignors to Swift & Company, Chicago, Ill., a corporation of Illinois
Filed Jan. 17, 1964, Ser. No. 338,453
3 Claims. (Cl. 99—109)

This invention relates to improvements in the manufacture of meat products and more particularly to an improved method and apparatus for rapidly and continuously producing shaped at least partially self-sustaining products containing meat from comminuted meat mixtures.

The manufacture of meat products from meat emulsion has undergone several important changes in the past few years. The manufacture of sausages and frankfurters in particular has, in the past, involved finely chopping a mixture of meats, spices, flavorings and curing materials into an emulsion, stuffing the raw meat emulsion into artificial casings, tying off the casings into links, and smoking and cooking. In such procedures the casing is peeled off the frankfurter and discarded after cooking. This traditional method of manufacturing frankfurters requires the use of substantial amounts of labor and is comparatively expensive in view of the labor costs.

The more modern continuous methods for producing frankfurters and other sausage products have involved the heating of meat emulsion in a flexible casing by electrical heating to quickly coagulate the protein in the emulsion. Another method involves coagulation of the raw meat emulsion in individual molds by electrical heat. Still another technique suggested comprises heating the meat emulsion before placing the emulsion in the mold and utilizing the residual heat in the meat emulsion to set up the product in the mold. This technique involves critical control of time and temperature, so critical, in fact, that the procedure is difficult to adapt to commercial conditions.

It has previously been considered impractical to heat a meat emulsion in a mold while the emulsion is moving through the mold utilizing a heated fluid to attain coagulation temperature. In such conduction-type heating the heat reaches the center of the meat product by conduction through the walls of the mold and the meat itself. It has been felt that heat transfer in such case is too slow for commercial application, and if the mold temperature is raised to increase the rate of coagulation and accelerate the process, the outside surface of the meat adjacent to the inner surface of the mold will scorch or burn.

It is an object of this invention to provide a rapid and continuous method for forming a rod of substantially coagulated meat emulsion having sufficient rigidity or strength to permit handling in a continuous fashion.

Still another object of the invention is the provision of a continuous method for manufacturing molded meat products by continuously extruding meat mixtures containing comminuted meat through a forming zone, the walls of which possess particular characteristics well adapted to the shaping and partial coagulation of continuously flowing meat mixture.

Still another object of the invention is the provision of a method for shaping and setting up meat emulsion continuously by passing said meat emulsion through a shaping passage made up of synthetic thermoplastic having well-defined tensile strength and stiffness as well as surface characteristics permitting the continuous movement of meat emulsion therethrough.

Additional objects, if not specifically set forth herein, will be readily apparent to those skilled in the art from the detailed description of the invention which follows.

While the invention is directed primarily to comminuted meat-containing emulsions such as are employed in the production of sausage product including frankfurters, it is also useful in the production of agglomerates of meat made up of meat pieces somewhat larger than a generally accepted comminuted meat emulsion. The method involves providing a meat-containing emulsion under pressure and passing this meat-containing emulsion under pressure through a forming conduit or tube while heating the conduit or tube with a fluid. The pressure under which the meat is expelled determines the rate of flow through the forming device and the meat-containing mixture is formed into the desired cross-sectional configuration during passage through the forming section of the device. A continuous rod of at least partially set-up meat emulsion is provided and the products obtained after severing lengths from the rod are substantially equivalent to products currently marketed with respect to taste, color, texture and keeping qualities. However, these products can be produced much more rapidly and in a much more economical manner than by known procedures.

The device illustrated in the figure shows generally one combination of apparatus suitable for practicing the instant invention. In the figure a stuffer 10 is connected through a conventional stuffing horn 11 to a tube adaptor 12 to a substantial length of coiled synthetic plastic tubing 13. The tubing is held in a container 14 by tube retainers 15 and 16. The container may contain liquid which can be heated by a heater (not shown). At the discharge end of the forming plastic tubing 17 the product enters a holding block 18 above which is located an air-operated rotating knife 19 movably mounted on tracks for severing a rod of product emanating from the forming tube. The cutoff device is set at an angle of about 30–45 degrees to permit the product to slide clear after cutting. The cut off pieces of meat are permitted to fall into an inclined receiving trough 20 and from this trough pass to a take off conveyor 21.

The heating medium surrounding the forming and coagulation zone should be adequate to heat the flowing mixture to a temperature sufficient to produce a set in the product. If the product is moving at about 16.7 feet per minute as would be the case with a one hundred foot coiled tube, the material must be in the heating zone at a temperature of about 160° F. for about 6 minutes in order to obtain good coagulation of the protein. With a more rapid rate of passage of the product through the heating zone, the temperature of the zone should be higher, while much lower temperatures can be used if the rate of the flow of product is reduced. The length of tubing being heated in the heating zone is a factor controlling the amount of heat to be applied since with a long forming zone the product is present in the heating area for a long period of time and it is not necessary to heat to as high a temperature as would be the case with an abreviated heating zone to reach the desired attainment temperature. Those skilled in the art can easily adjust the heating temperature and required residence time for the moving product in the heating area for a given length of forming tubing in the heating zone. Under proper temperature and time conditions, the product undergoes partial coagulation sufficient to impart to the meat a self-sustaining structure of sufficient strength to permit handling in subsequent operations including cooking, if required, and smoking. The steps of the process involve continuously forming and shaping the meat emulsion prior to coagulation and heating the formed emulsion to at least partially set the emulsion to a substantially self-sustaining form.

More particularly the invention involves passing an emulsion containing comminuted meat and at a temperature of around 30–90° F. into a shaping zone by extruding the emulsion under pressure from a stuffer or equivalent device. The meat emulsion should not attain a temperature in excess of about 110° F. prior to passage into the forming zone since there is danger of setting up before it is shaped and critical handling procedures are required to avoid premature coagulation before shaping if temperatures much above 90° F. are attained. Generally the meat entering the forming zone should be at a subcoagulation temperature. By subcoagulation temperature is intended a temperature below that at which the meat will set up in about 15 minutes if held at that temperature. The raw meat emulsion at a temperature of about 30–110° F. is passed into the shaping zone under pressure and the product is shaped and heated to a coagulation temperature in this zone. The temperature of the product is raised to at least about 120° F. and generally not substantially in excess of about 250° F. during passage through the forming and shaping zone. The temperature of the liquid in the bath in which the tubing is immersed will of course be varied depending upon the length of time during which the product is moving through the heating zone. The product will desirably be moved more rapidly when the liquid in the bath is held at a high temperature and more slowly where the liquid is held at lower temperatures. Usually the fluid in the heating zone is water which is held at a temperature of about 150–212° F. for best results. Higher temperatures up to about 300° F. can be employed if hot air is used or the liquid in the bath is a high boiling oil for example.

The physical nature of the material making up the forming zone is important to the free and continuous movement of the product through this zone. The natural lubricity and flexibility of the internal surface of the forming zone over which the meat emulsion is passed is important in obviating difficulties such as emulsion breaking, the separation of fat or letting of water as the emulsion is heated, and the tendency of raw protein to adhere to surfaces when cooked. It has been found that synthetic thermoplastics which are sufficiently rigid to resist deformation by the meat product, yet sufficiently flexible to permit a product to pass through the forming section without sticking, can be characterized as having a suitable tensile strength and rigidity defined by percent elongation and modulus of elasticity. The materials used in the construction of the forming zone should have a percent elongation as measured by ASTM method D638 of not less than about 25% and generally in the range of about 25–1000%. The thermoplastic should also have a modulus of elasticity in p.s.i. as measured by ASTM procedure D747 not substantially in excess of about 300,000 p.s.i. and generally in the range of about 25,000–300,000 p.s.i. In view of these requirements rigid conduits made of glass or metal such as stainless steel are not suitable for use in the invention and thin, very flexible thermoplastic films are not suitable for use in the invention since the forming device then does not meet the requirements with respect to rigidity and elasticity. Suitable thermoplastic resins which can be employed to produce forming sections of any desired cross-sectional shape such as oblong, oval, round, square, triangular, etc., include medium density polyethylene, polypropylene, Teflon (tetrafluoroethylene), and cellulose acetate butyrate. Those materials having a modulus of elasticity and elongation as noted above, when used to provide the forming section offer a resistance transverse to the flow of the meat product of at least about 50,000 p.s.i., but less than about 300,000 p.s.i. Such materials as polystyrene, stainless steel and Pyrex glass, because of their high tensile strength and low elasticity are not suitable for use in the forming zone.

Specific embodiments of the invention are illustrated in the following examples. It should be understood that these examples are set forth herein in the illustrative sense and should not be interpreted as imposing any limitation on the invention.

*Example I*

A frankfurter formation was prepared by chopping the following ingredients:

| | |
|---|---|
| Beef | lbs__ 70 |
| Regular pork trim | lbs__ 30 |
| Ice | lbs__ 30 |
| Salt | lbs__ 2 |
| Sugar | lbs__ 2 |
| Prepared flavoring | lb__ ½ |
| Sodium nitrite | oz__ ¼ |
| Ascorbic acid | oz__ ¾ |

The device used include a stuffing horn attached to polyethylene tubing 6 feet long, 1 inch in outside diameter and ⅛ inch wall thickness. This polyethylene tubing was coiled and the coil was surrounded by water held at 158° F. The previously prepared frankfurter emulsion was passed through this tubing from the stuffer at a rate of 0.2 lb. per minute. At this flow rate 6 minutes was required to attain an internal temperature in the formed self-sustaining rod of 127° F. A similar run wherein the emulsion was extruded at the rate of 0.1 lb. per minute and the bath temperature was held at 150° F. required 12 minutes in the tubing for the product to attain an internal temperature of 126° F. In both cases the product emanating from the dicharge end of the forming tube possessed a firm self-sustaining form and the surface of the product was smooth and substantially free of any irregularities or depressions. There was no evidence of exudation of fat.

Another test utilizing the same emulsion involved extrusion through the apparatus in substantially the same fashion with the exception that Pyrex glass tubing having the same dimensions as the polyethylene tubing used above was substituted for the polyethylene tubing. The product when passed through the tube and heated by the water bath stuck to the sides of the tube and satisfactory forming could not be attained. Similar unsatisfactory results were noted when stainless steel, acrylic, phenolic, tygon, and polystyrene tubes were substituted for the polyethylene tubing.

*Example II*

A 50-foot length of polyethylene tubing having an internal diameter of ⅞ inch and a wall thickness of 0.093 inch, was surrounded with water in a water bath held at 150° F. A previously prepared frankfurter emulsion identical with that utilized in the procedure described in Example I was extruded through the polyethylene tubing utilizing a stuffing pressure of 70 lbs. per square inch. The flow rate of the emulsion through the forming device was 2 lbs. per minute and the forming emulsion remained in the heating zone for 6 minutes. The continuously formed and extruded rod of self-sustaining meat emulsion had an internal temperature of 120° F. as it exited from the forming zone. The partially cooked product had a smooth surface substantially free of any evidence of exudation of fat or moisture.

*Example III*

A sausage-type formula used in the production of precooked sausages was prepared from the following ingredients:

| | Pounds |
|---|---|
| Pork trim (50:50) | 100 |
| Salt | 2 |
| Sugar | 2 |
| Prepared seasoning | ½ |
| Ice | 10 |

Six feet of Teflon (polyfluoroethylene) tubing, having a diameter of 1⅛ inches and a wall thickness of ⅛ inch, was used as the forming tube in this experiment. The temperature of the water in the bath in which the Teflon (tetrafluoroethylene) tubing was immersed was held at 150–160° F. and the product which formed had the meat thereof partially coagulated so as to provide a smooth-surfaced self-sustaining product.

Example IV

The formulation utilized in the preceding example was also utilized in this run. The forming section of the apparatus which was attached to the stuffer was made up of polyethylene tubing 36 feet long, ⅞ inch inside diameter, and having a wall thickness of 0.093 inch. The stuffing pressure was varied in the range of from 50–80 pounds per square inch and the water temperature in the bath through which the polyethylene tubing passed was held at 148–152° F. As the product exited from the tube the internal temperature thereof varied between 126° F. and 140° F. The product had a very smooth surface and showed little evidence of greasing out.

While the apparatus and method of the invention are described with reference to the continuous production of a coagulated meat emulsion product, it also has application to the production of coagulated meat pieces from nonemulsion comminuted and chunked meat mixtures.

The invention can be applied to heat coagulable food products generally, including non-meat coagulable proteins. By "meat" is intended the flesh of quadrupeds, fowl and fish. Tuna fish emulsions for example, can be produced in the form of frankfurters very conveniently by the instant method.

Obviously many modifications and variations of the invention as hereinbefore set forth may be made without departing from the spirit and scope thereof and, therefore, only those limitations should be imposed as are indicated in the appended claims.

We claim:

1. A method for continuously forming meat product comprising continuously passing meat emulsion containing comminuted meat under pressure through a forming device, said forming device being constructed of rigid plastic having a percent elongation of about 25–1,000 and modulus of elasticity of about 25,000–300,000, continuously conductively heating said meat emulsion during passage through said forming device to a temperature sufficient to set said meat product to a self-sustaining form and continuously removing said meat product having a self-sustaining form from said device.

2. A rapid method for forming self-sustaining meat products comprising continuously passing meat emulsion containing comminuted meat under pressure through a forming zone in contact with the walls of said zone, the walls of said zone being constructed wholly of a synthetic thermoplastic polymer having a percent elongation in excess of about 25% and a modulus of elasticity not substantially in excess of about 300,000 p.s.i., said polymer being selected from the group consisting of medium density polyethylene, polypropylene, tetrafluoroethylene, and cellulose acetate butyrate; continuously heating said emulsion by conduction through said polymer from a high temperature fluid exterior to increase the temperature thereof to above about 120° F. whereby to coagulate the meat protein and impart a self-sustaining form to said meat and continuously removing coagulated meat from said zone.

3. A rapid method for forming self-sustaining meat products comprising continuously passing meat emulsion containing comminuted meat under pressure through a forming zone in contact with the walls of said zone, the walls of said zone being constructed wholly of a synthetic thermoplastic polymer having a percent elongation in excess of about 25% and a modulus of elasticity not substantially in excess of about 300,000 p.s.i., said polymer being selected from the group consisting of medium density polyethylene, polypropylene, tetrafluoroethylene, and cellulose acetate butyrate; continuously heating said emulsion by conduction through said polymer from a high temperature fluid exterior to increase the temperature thereof to above about 120° F. whereby to coagulate the meat protein and form a self-sustaining rod; continuously passing said coagulated emulsion out of said zone and severing said rod.

References Cited
UNITED STATES PATENTS

| | | | |
|---|---|---|---|
| 2,860,991 | 11/1958 | Christianson et al. | 99—109 |
| 2,953,461 | 9/1960 | Prohaska | 99—109 |

OTHER REFERENCES

"Industrial and Engineering Chemistry," August 1952, volume 44, No. 8, pages 1800 to 1805, inclusive, article entitled Teflon Tetrafluoroethylene Resin Dispersion.

HYMAN LORD, *Primary Examiner.*

RAYMOND N. JONES, A. LOUIS MONACELL,
*Examiners.*